(12) United States Patent
Mohamed

(10) Patent No.: US 8,934,690 B2
(45) Date of Patent: Jan. 13, 2015

(54) METHOD FOR PROCESSING VASCULAR STRUCTURE IMAGES

(75) Inventor: Ashraf Mohamed, Houston, TX (US)

(73) Assignee: Siemens Aktiengesellschaft, Munich (DE)

( * ) Notice: Subject to any disclaimer, the term of this patent is extended or adjusted under 35 U.S.C. 154(b) by 497 days.

(21) Appl. No.: 12/912,371

(22) Filed: Oct. 26, 2010

(65) Prior Publication Data

US 2011/0096996 A1    Apr. 28, 2011

Related U.S. Application Data

(60) Provisional application No. 61/255,550, filed on Oct. 28, 2009.

(51) Int. Cl.
*G06K 9/00* (2006.01)
*G06T 19/20* (2011.01)

(52) U.S. Cl.
CPC .............. *G06T 19/20* (2013.01); *G06T 2210/41* (2013.01); *G06T 2219/2012* (2013.01)
USPC ........................................... 382/131; 382/128

(58) Field of Classification Search
CPC ............ G06T 19/20; G06T 2219/2012; G06T 2210/41
See application file for complete search history.

(56) References Cited

U.S. PATENT DOCUMENTS 7,379,062 B2 * 5/2008 Poole ............................ 345/424
2009/0214097 A1 * 8/2009 Mohamed et al. ............ 382/131

OTHER PUBLICATIONS

Antiga et al., "Robust and objective decomposition and mapping of bifurcating vessels", Jun. 2004, IEEE Transactions on Medical Imaging, vol. 23, Iss. 6, p. 704-713.*
Vannier et al., "Biomedical Image Segmentation", Oct. 7, 1998, Proceedings of International Conference on Image Processing 1998, vol. 2, p. 20-24.*
Antiga, Ene-lordache, and Remuzzi, "Computational Geometry for Patient-Specific Reconstruction and Meshing of Blood Vessels From MR and CT Angiography", May 2003, IEEE Transactions on Medical Imaging, vol. 22, No. 5, p. 674-684.*
Piccinelli et al., "A Framework for Geometric Analysis of Vascular Structures: Application to Cerebral Aneurysms", Aug. 2009, IEEE Transactions on Medical Imaging, vol. 28, iss. 8, p. 1141-1155.*
S. Haker, S. Angenent, A. Tannenbaum, R. Kikinis, G. Sapiro, M. Halle, entitled "Conformal Surface Parameterization for Texture Mapping," IEEE Transactions on Visualization and Computer Graphics, Apr.-Jun. 2000, vol. 6 (No. 2), pp. 181-189.
X. Gu, Y. Wang, T. F. Chan, P. M. Thompson, S.-T. Yau, entitled "Genus Zero Surface Conformal Mapping and its Applications to Brain Surface Mapping," IEEE Transactions on Medical Imaging, Aug. 2004, vol. 23 (No. 8), pp. 949-958.

* cited by examiner

*Primary Examiner* — Stephen R Koziol
*Assistant Examiner* — Timothy Choi

(57) ABSTRACT

A method (100) of processing clinical 3D imaging of blood vessels in order to enable an analysis of the shape of blood vessels of a person, a statistical analysis of the shape and properties of blood vessels in a group of individuals, and the detection and quantification of blood vessel diseases.

18 Claims, 4 Drawing Sheets

METHOD FOR PROCESSING VASCULAR STRUCTURE IMAGES

CROSS-REFERENCE TO RELATED APPLICATIONS

This application claims the benefit of Provisional U.S. Patent Application Ser. No. 61/255,550 entitled, "Standardized Mappings for Morphological Analysis of Blood Vessels", filed in the name of Ashraf Mohamed on Oct. 28, 2009, the disclosure of which is also hereby incorporated herein by reference.

FIELD OF INVENTION

This invention relates to 3D imaging of blood vessels (angiography). This invention relates in particular to processing 3D image datasets of blood vessels to enable analyses of the shapes and properties of the blood vessels.

BACKGROUND OF THE INVENTION

Angiography is the medical imaging technique used to visualize the lumen of the blood vessels and organs of the body, including the arteries and veins. Three-dimensional (3D) angiography includes a family of techniques achievable by imaging modalities such as magnetic resonance, computed tomography, ultrasound, and cone-beam X-ray imaging. A 3D angiographic image presents a wealth of information on normal and pathological vessel morphology. These 3D images are used in the diagnosis of vascular abnormalities, disease quantification, treatment planning, and guidance during interventional medical procedures.

Diseases which induce changes in the shape of blood vessels include atherosclerosis, aneurysms, and arterio-venous malformations including fistulas. Atherosclerosis is a disease which is characterized by the deposition of fatty materials, such as cholesterol, and calcium (at more advanced stages or the disease) on the inside surface of the artery wall. Atherosclerosis is also associated with stenosis (i.e. blood vessel narrowing) both locally and in downstream branches of a person's vascular structure. An aneurysm is a pathological bulge or dilatation of the blood vessel wall, which may lead to blood vessel rupture and internal bleeding. Arterio-venous malformations, including fistulas, are abnormal connections or shunts between the arterial and the venous blood vessels, without the normal intervening bed of blood capillaries.

To detect, diagnose, and treat blood vessel pathologies, physicians and other healthcare professionals rely on the visual examination of 3D angiography images and multiple 2D projection or cross sectional images (also known as angiograms). Recent advances in the medical image processing field have made available some software tools for semi-automated quantification of vascular diseases. Software tools for semi-automated quantification of the severity of blood vessel stenosis, and the size of aneurysms are available for use today on some clinical image processing workstations. These tools typically analyze blood vessels through an idealized model of a blood vessel, such as a tubular model with possible branching. One of general steps necessary for analyzing the shape of blood vessels is the extraction of the centerline of these vessels. For diseases like aneurysms or stenosis, the profile of the blood vessel diameter along the centerline abnormally expands or shrinks, respectively. Therefore, the diameter profile may be used to isolate the diseased portion of the blood vessel, and to quantify the severity of the disease. Importantly, the sensitivity of the approach used for analyzing the blood vessel abnormality depends on the initial step of centerline extraction. In addition, such analysis approaches can only result in a limited number of quantitative measures (e.g., area narrowing percentage in the case of stenosis) that are used to document the severity of the disease. In the case of diseases like aneurysms, it is often difficult to completely isolate the aneurysm from the blood vessel automatically, and a high degree of manual interaction is often necessary.

Thus, there is need for a standardized way of examining blood vessel surfaces by clinicians and researchers and for more effective ways of extracting the centerline of the blood vessels, and isolating diseases like aneurysms and stenosis during image processing of a patient's vascular structure.

More broadly, there is also a need for the processing of 3D images of blood vessels to more effectively enable the analysis of the shape of blood vessels of a person, the statistical analysis of the shape and properties of blood vessels in a group of individuals, and the detection and quantification of blood vessel diseases.

SUMMARY OF THE INVENTION

The above problems are obviated by the present invention which provides a method of computer-assisted modeling of a blood vessel in a 3D image, comprising a) isolating a blood vessel segment from the remaining vasculature present in the image; b) mapping the surface of the isolated blood vessel segment onto a standardized parametric space; and c) generating a mapped representation of the isolated blood vessel segment from the results of the mapping. The isolating step may comprises a) selecting two or more points on the image of a respective blood vessel to define the limits of the blood vessel segment to be mapped; b) determining a first disc representation, from a set of disc representations of increasing radii that are substantially perpendicular to the axis of the respective blood vessel, to completely separate the blood vessel into two distinct portions; and c) generating an isolated blood vessel segment to be mapped using the first disc representation. The mapping step may comprise generating a mapping transformation that is applied to the isolated blood vessel segment to transfer the surface of the segment to the standardized parametric space. In such case, the mapping transformation may be expressed in the mathematical form of: $\phi: V \rightarrow T$, where $\phi$ is a mapping function and V is the surface of the vessel segment to be mapped to the template T of the standardized parametric space.

The mapping transformation may be a homeomorphic function. In such case, the template T may be a uniform circular cylinder of a fixed radius and height, or a sphere with two caps cut off for a straight vessel segment. Alternatively, the template T may be a bifurcating uniform cylinder, with a 90 degree bifurcation angle, fixed radii and branch lengths, or a unit sphere with three caps cut off for a bifurcating vessel segment having two branches. Alternatively, the template T may be a unit sphere with a number of non-intersecting cut-off caps equal to the number of in-flowing and out-flowing pathways of the vessel segment for a vessel segment having N number of branches. Further, the pathologies of the vessel segment may be identified in the template T through properties of the mapping function. Further, the mapping function may comprise conformal mapping. Also, the method may further comprise the step of generating a coordinate frame for the surface of the vessel segment using the inverse of the mapping function.

The method may further comprise mapping surface-attached quantities of the isolated blood vessel segment onto standardized parametric space and generating a mapped representation of the surface-attached quantities from the results of the mapping surface-attached quantities.

The present invention may also provide a non-transitory computer readable media comprising software algorithms of computer-readable code that can be executed on a processor, the algorithms comprising a) an algorithm for isolating a blood vessel segment from the remaining vasculature present in a 3D image of blood vessels; b) an algorithm for mapping the surface of the isolated blood vessel segment onto a standardized parametric space; and c) an algorithm for generating a mapped representation of the isolated blood vessel segment from the results of the mapping. The media may further comprise an algorithm for segmenting the blood vessels from the background voxels in a 3D image of blood vessels and an algorithm for performing blood vessel surface extraction from the segmented 3D image to generate a blood vessel surface mesh of the blood vessels, said algorithm for isolating comprising an algorithm for isolating a blood vessel segment from the remaining vasculature present in the blood vessel surface mesh. Alternatively, the media may further comprise an algorithm for mapping surface-attached quantities of the blood vessel segment onto standardized parametric space and an algorithm for generating a mapped representation of the surface-attached quantities from the results of the mapping surface-attached quantities. In such case, the media may further comprise an algorithm for segmenting the blood vessels from the background voxels in a 3D image of blood vessels; an algorithm for performing blood vessel surface extraction from the segmented 3D image to generate a blood vessel surface mesh of the blood vessels, said algorithm for isolating comprising an algorithm for isolating a blood vessel segment from the remaining vasculature present in the blood vessel surface mesh; and an algorithm for extracting surface-attached variables for each blood vessel of the blood vessel surface mesh to generate surface-attached quantities.

The present invention may also provide a method of processing the 3D images of a patient's vascular structure, comprising constructing mathematical maps from the surfaces of imaged blood vessels to standardized template shapes that describe the general appearance and interconnections of blood vessels for visualization of the vessel surfaces. The step of constructing may comprise generating a mapped visual representation of respective vessel segments in standardized parametric space and a mapped visual representation of surface-attached quantities of the respective vessel segments in standardized parametric space. The method may further comprise analyzing the morphology of the imaged blood vessels from the constructed mathematical mappings with regard to the pathology of the imaged blood vessels.

The present invention may also provide a medical imaging apparatus, comprising means for processing the image data of the vascular structure of a subject to enable the analysis of the shapes and properties of the blood vessels of the subject, said means for processing comprising means for constructing mathematical maps from the surfaces of the imaged blood vessels to standardized template shapes that describe the general appearance and interconnections of blood vessels. The apparatus may further comprise an image scanner that acquires image data of the vascular structure and generates image data signals for usage by the means for processing. The apparatus may also further comprise a non-transitory image data storage medium that is adapted to store the image data signals that are generated by the image scanner and the results of any additional operations on the image data signals by the means for processing.

Advantageously, the present invention provides an approach for mapping the surface of a blood vessel onto a standardized parametric space that makes it possible to conduct longitudinal and cross-sectional group studies which test hypotheses linking local surface attached variables (such as local surface irregularities, or simulated surface quantities, such as pressure) with pathology and clinical outcome. This may provide a standardized way of examination of blood vessel surfaces by clinicians and researchers. In addition, the method provides a means for extraction of the centerline of the blood vessels, and for isolation of aneurysms and stenosis. This has a large number of applications for treatment planning.

Also, the present invention provides a rich set of tools for studying and analyzing blood vessel morphology. As will be further noted below, a number of applications can benefit from this including:

1) studying normal and abnormal variations in the blood vessel morphology across groups of individuals;

2) accurately isolating the diseased portion of the blood vessel, such as the aneurysm or stenotic region;

3) quantification of the blood vessel pathology, such as aneurysm ostium size, length, and degree of stenosis; and 4) detecting correlations between blood vessel disease and morphology. For example, stenosis at a particular blood vessel (e.g., in the right carotid artery) may be correlated with the shape, branching pattern, or tortuousity of nearby blood vessels or blood vessels in the contralateral hemisphere. These types of correlations may be difficult to detect visually, but are possible to detect through pattern analysis and machine learning techniques, after the blood vessels have been mapped to the canonical space.

DESCRIPTION OF THE DRAWINGS

For a better understanding of the present invention, reference is made to the following description of an exemplary embodiment thereof, and to the accompanying drawings, wherein.

DETAILED DESCRIPTION

Figure 1:
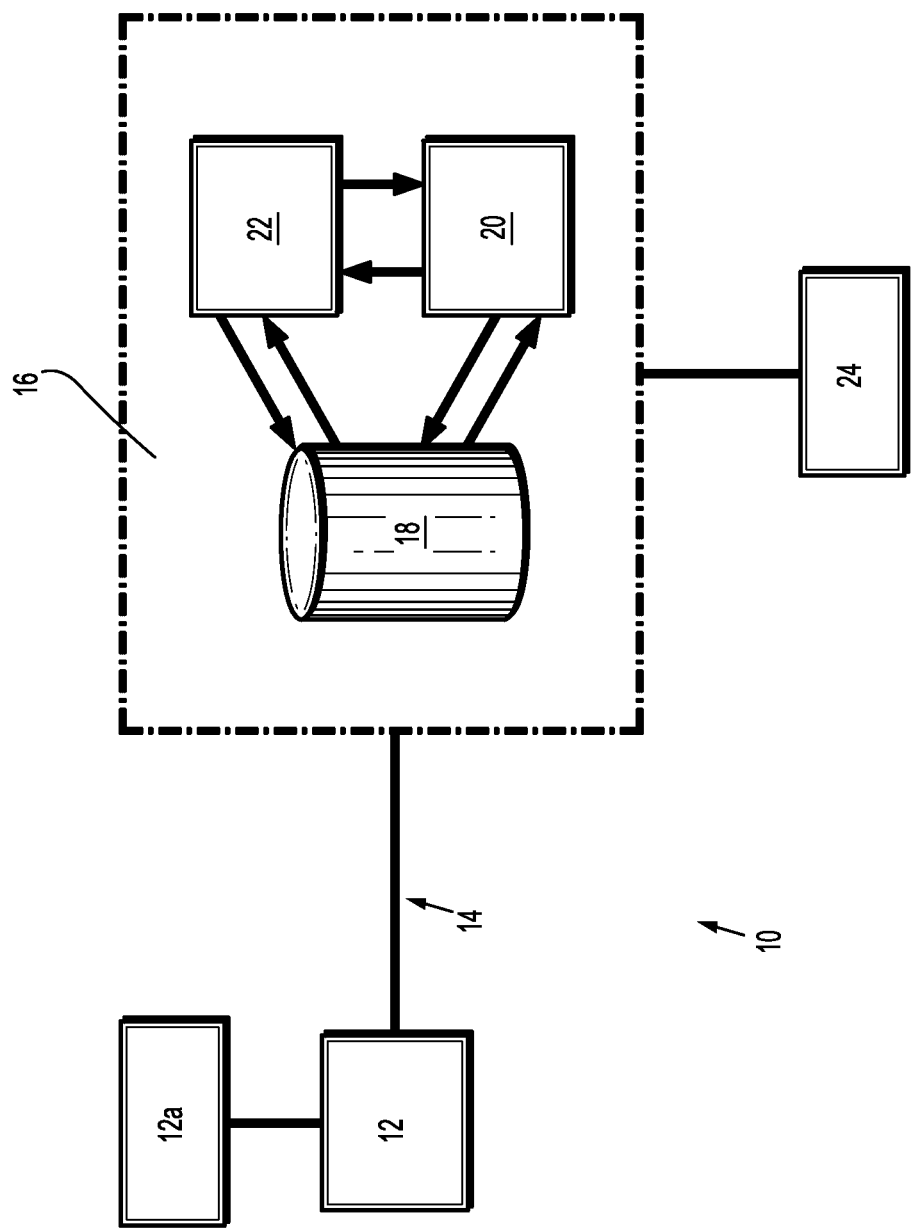
FIG. 1 is a block diagram of a medical imaging system (simplified) operable in accordance with the present invention.

FIG. 1 is a block diagram of a medical imaging system 10 (simplified) that operates in accordance with the present invention. The system 10 comprises a medical imaging scanner 12 that acquires image data of a patient under examination and, more particularly in this case, the vasculature of the patent. The scanner 12 may use any appropriate imaging modality to acquire the image data, for example, magnetic resonance, computed tomography, ultrasound, and X-ray imaging. The scanner 12 may acquire raw image data from multiple scanned views of the region of interest of the patient, reconstruct the images, and produce image data signals for the multiple views. The image data signals may be in Digital Imaging and Communications in Medicine (DICOM) format. Other formats may also be used.

The imaging scanner 12 is operably connected to a computer system 12a that controls the operation of the scanner 12 and, via a communication channel 14, to an image processing system 16 that processes the image data signals utilizing appropriate image processing software applications. The image processing system 16 has an image data archive or database 18, an application server 20, and a user workstation 22. The components of the image processing system 16 are interconnected via a communications network that may be implemented by physical connections, wireless communications, or a combination. The image data archive or database 18 is adapted to store the image data signals that are produced by the image scanner 12 as well as the results of any additional operations on the image data signals by the other components of the image processing system 16. The image data archive or database 18 may be a Picture Archiving and Communications System (PACS). Other types of image data archives or databases may also be used. The user workstation 22 is adapted to control the operation of the imaging processing system 16 and its various components. The user workstation 22 particularly operates the application server 20 and the various image processing software applications that are stored in, or are accessible by, the server 20. The application server 20 also manages and coordinates the image data sets among the image processing applications. The image processing applications may include, for example, visualization applications, computer-aided diagnosis (CAD) applications, medical image rendering applications, anatomical segmentation applications, or any other type of medical image processing application. The image processing applications may also include the methods of the present invention. The image data archive or database 18, applications server 20, and the user workstation may also each be connected to a remote computer network 24 for communication purposes or to access additional data or functionality. The workstation 22 may comprise appropriate user interfaces, like displays, storage media, input/output devices, etc.

The various components of the imaging system 10 are conventional and well known components. They may be configured and interconnected in various ways as necessary or as desired. The imaging system 10 and, in particular, the image processing system 16 is adapted to permit the imaging system 10 to operate and to implement methods in accordance with the present invention, for example, as shown in FIG. 2.

Figure 2:
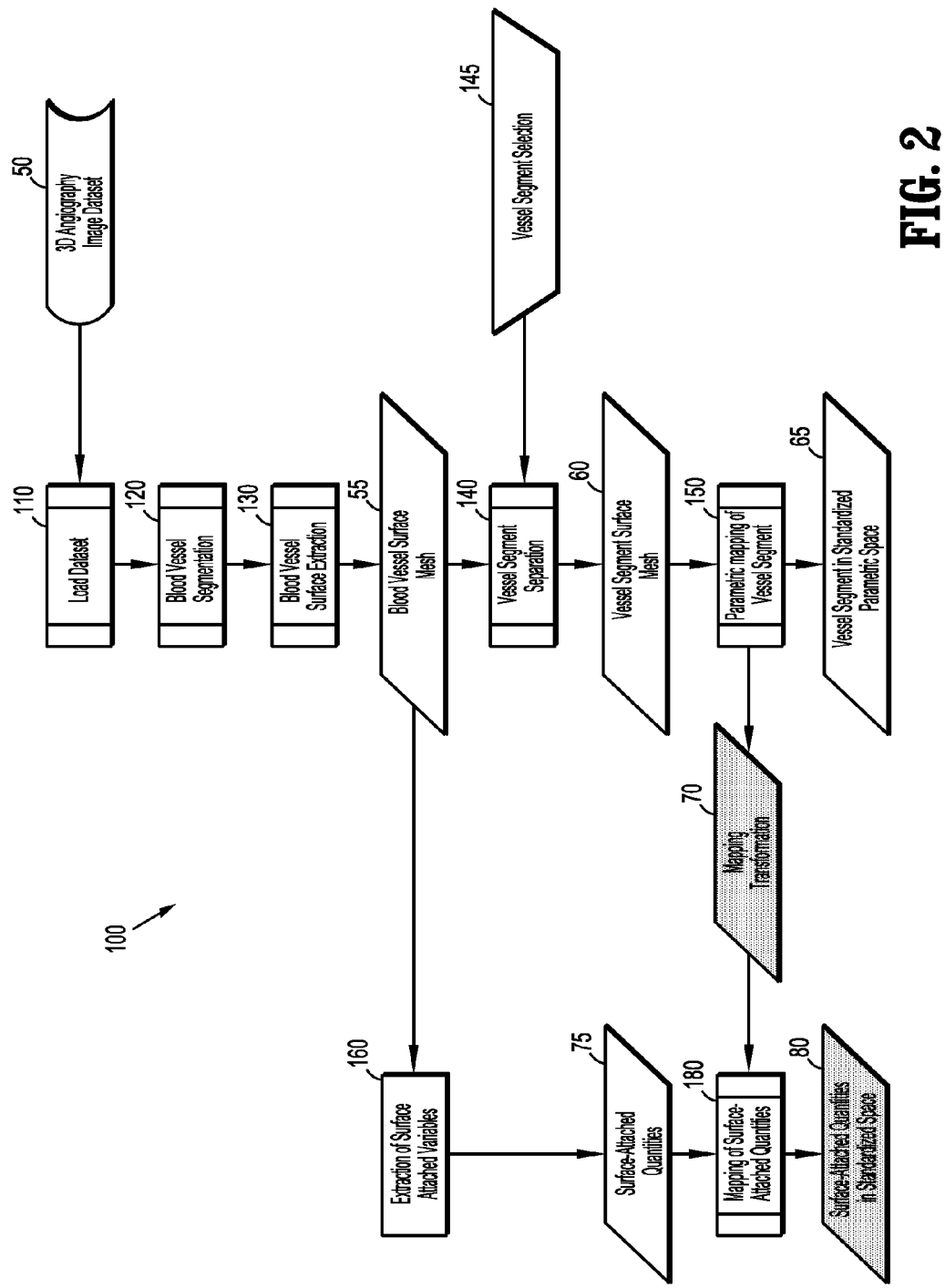
FIG. 2 is a flow chart of a method of processing 3D image datasets of blood vessels implemented in accordance with the present invention.

FIG. 2 shows a method 100 of processing 3D image datasets of blood vessels carried out in accordance with the present invention. The method 100 obtains both a mapping transformation which is used to analyze the morphological characteristics of a blood vessel segment and a mapped representation of surface-attached variables to the vessel segment. As noted above, the described approach can be applied to three dimensional (3D) images of any medical imaging modality in which blood vessels and aneurysms are visible. This includes 3D Digital Subtraction Angiography (DSA), Magnetic Resonance Angiography (MRA), or Computed Tomography Angiography (CTA).

After the 3D angiography image dataset 50 of the patient's vascular structure is acquired by the respective image scanner 12, the image processing system 16 loads the dataset 50 as an input for a mapping transformation process that comprises several sub-processes or methods (step 110). The method 100 may retrieve the dataset 50 from scanner 12 or from the image data archive or database 18 if previously stored. The dataset 50 is first operated on to provide blood vessel segmentation of the image(s) of interest of the vascular structure (step 120). The segmentation process separates the blood vessels from the background image voxels. Numerous blood vessel segmentation approaches are known and described in the literature and the particular segmentation process used depends on the imaging modality used by the healthcare professional in acquiring the dataset 50. Segmentation is the only step of the method 100 that is imaging modality-dependent.

The segmented image dataset then undergoes blood vessel surface extraction (step 130). Surface extraction is a step that generates a surface mesh 55 of the blood vessels (including any aneurysms) from the segmented 3D image. For example, an approach that generates a triangular surface mesh from volumetric datasets can be used, such as the marching-cubes algorithm or any of its variants. Other approaches can be used; however, the used approach needs to preserve the topological properties of the aneurysm surface (e.g., generates no handles or surface holes).

The method 100 applies a mathematical mapping to the surface of each blood vessel segment separately. A blood vessel segment may be straight or bifurcating (i.e., dividing or branching into branches). However, before the mapping is applied, it is necessary to isolate each blood vessel segment to which the mapping is applied from the remaining portion of the vasculature present in the surface mesh 55. This is called vessel segment surface separation (step 140). This can be achieved in a number of ways. Automated methods that divide the vasculature present in the image into segments based on centerline and bifurcation points are well known and may be used. The method 100 provides a semi-automated approach. Through an appropriate graphical user interface (of the user workstation 22 or the image processing system 16 generally) with volume rendering or surface rendering of the extracted blood vessels, a healthcare professional identifies and selects (for example, by the point and click feature of a computer mouse) two or more points on the vessels in order to define the limits of each blood vessel segment to which the mapping must be applied (step 145). At each one of these selected points, the method 100 defines a set of discs of increasing radii that are substantially perpendicular to the axis of the respective vessel. The first disc to completely separate the blood vessel into two distinct portions is used to generate an isolated vessel segment surface mesh 60 to be subsequently mapped.

The method 100 uses the isolated vessel segment surface meshes 60 for parametric mapping of each isolated vessel segment (step 150). Parametric mapping is a mathematical method that results in a mathematical representation of the mapping transformation (function) 70 that is described below in detail. As noted above, the mapping transformation 70 is used to analyze the morphological characteristics of a blood vessel segment. For each isolated vessel segment 60, the method 100 applies the mapping transformation 70 (part of step 150 and not shown separately) and obtains a vessel segment, i.e. the surface of the respective vessel segment, in standardized parametric space 65.

The method 100 also uses the blood vessel surface meshes 55 for extracting surface-attached variables for each blood vessel (step 160) in order to derive or generate surface-attached quantities 75. These variables may be, for example, local surface irregularities, or simulated surface quantities such as pressure. The specific variables operated on by the method 100 depends upon the research or the clinical application of interest or importance to the healthcare professional. So, for example, in a research study, a hypothesis may be that the surface curvature at some part of the artery is related to a certain disease. The healthcare professional will then choose the surface variable and quantity that is important for the problem studied. Simulated quantities are those that result from running a physics simulation, such as computational fluid dynamics simulation, on the vessel segment surface mesh 60. The simulation will generate these variables such as pressure or wall shear stress. The method 100 applies the mapping transformation 70, previously generated, to the surface-attached quantities 75 so that they are transferred (i.e., mapped) into the standardized space (step 180). This obtains a mapped representation of the surface-attached variables in standardized space 80.

The goal of the parametric mapping a vessel segment surface 60 (step 150) is to generate a mathematical mapping transformation 70, expressed as:

$$\phi: V \to T,$$

where $\phi$ is a mapping function and V is the surface of the vessel segment to be mapped to the template T. The method 100 requires the following important property of this transformation: the domain V and template T must be topologically equivalent to each other (mathematically speaking, they are homeomorphic). This implies that there exists a function mapping V to T that is continuous, bijective (i.e., one-to-one and onto, so that every member of each set is uniquely paired with a member of the other set), and with a continuous inverse.

Figure 3:
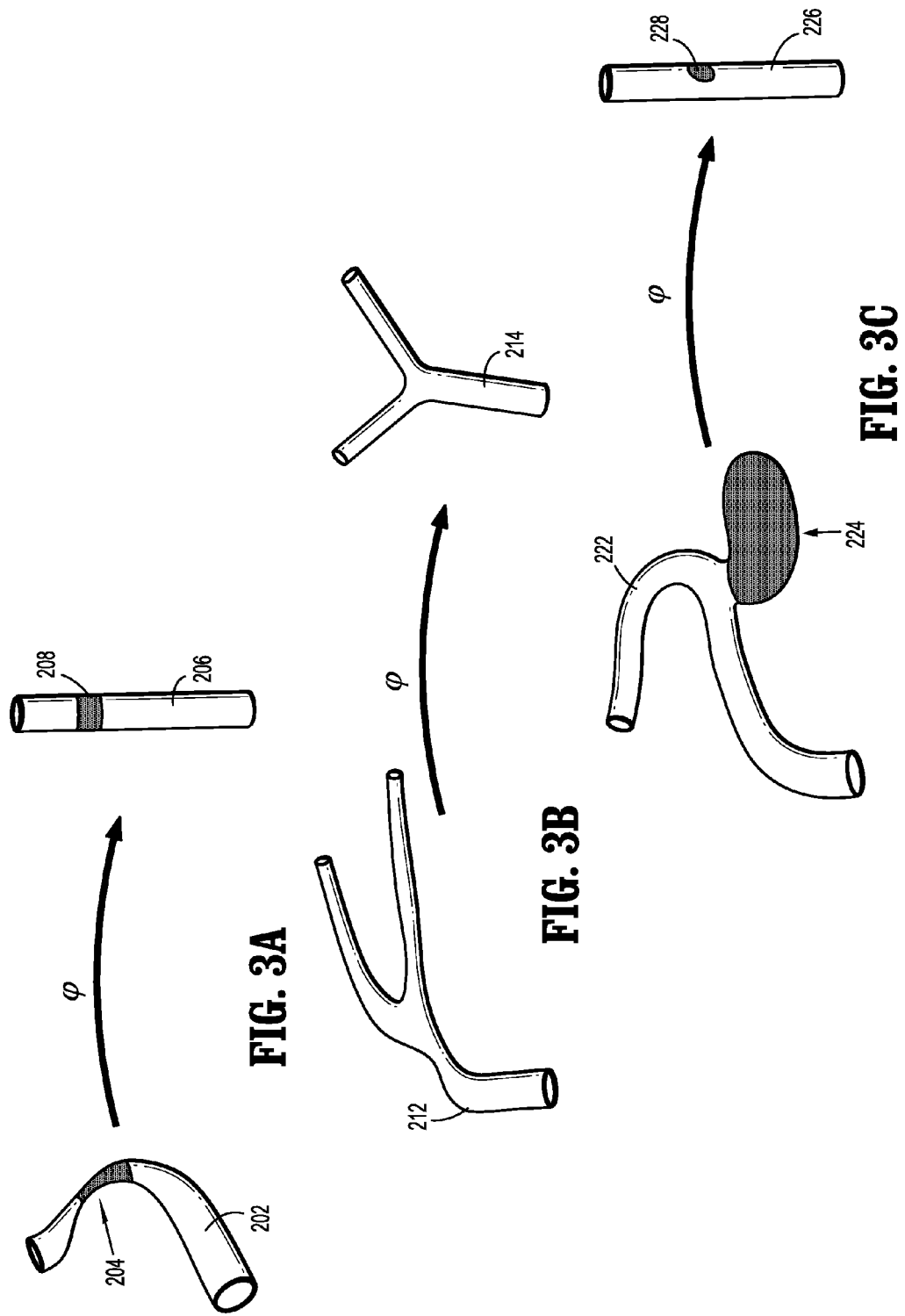
FIGS. 3a, 3b and 3c are each a diagrammatic representation of a mapping result utilizing the method of FIG. 2.

The mapping function $\phi$ of the method 100 is an example of a homeomorphic function. For a straight blood vessel segment, a topologically equivalent template may be one of the following: a) a uniform circular cylinder of a fixed radius and height, or b) a sphere with two caps cut off. Also, a bifurcating vessel segment having two branches may be topologically equivalent to one of the following templates: a) a bifurcating uniform cylinder, with a 90 degree bifurcation angle, fixed radii and branch lengths, or b) a unit sphere with three (3) caps cut off. Therefore, for a vessel segment involving N branches, a topologically equivalent surface is that of a sphere with N non-intersecting caps removed. The number of caps removed from the sphere is equal to the total number of in-flowing and out-flowing arteries of the vessel segment. Mappings of a straight vessel segment to a uniform circular cylinder are illustrated in FIG. 3. However, the approach is equally valid for other types of vessel segments and other templates.

FIG. 3 shows exemplary mapping results of utilizing the mapping function $\phi$ for some types of vessel segments during the parametric mapping (step 150). FIG. 3a particularly shows a mapping of a straight vessel segment 202 with stenosis 204 to a uniform circular cylinder 206. The stenotic segment 208 is identified in the template space (i.e., the uniform circular cylinder 206) through properties of the mapping function $\phi$, including its deformation gradient and Jacobian function. FIG. 3b shows a mapping of a bifurcating vessel segment 212 to a template space of a bifurcating cylinder 214 with standard radii, length and bifurcation angle. FIG. 3c shows a mapping of a straight vessel segment 222 with an aneurysm 224 to a uniform circular cylinder 226. The aneurysm portion 228 of the vessel is identified in the template space through the properties of the mapping function $\phi$, including its deformation gradient and Jacobian function.

The mapping of a straight vessel segment to a uniform circular cylinder of unit length l and a radius R is further considered. Since coordinates can be assigned to every point in the cylinder ((l,θ): a height along the cylinder and a radial angle), and since the mapping function $\phi$ is bijective, a unique pair of coordinates (or parameters) is assigned to each point on the vessel surface. Therefore, the inverse mapping function $\phi^{-1}$ provides a "parameterization" of the surface of the vessel segment. Mapping different vessel segments from different patients onto the same template space (e.g., a uniform circular cylinder) establishes correspondence between points that are assigned the same parameters on the different vessel segments. Moreover, the template space acts as a normalization domain to which data attached to different vessel surfaces can be pooled (via the mapping function $\phi$) and used for cross-sectional and longitudinal group studies.

The method 100 may obtain and use different types of homeomorphic mapping functions $\phi$. To minimize distortion caused by the mapping, it is possible to choose the mapping that preserves a local quality of the surface V. For example, it is possible to choose a mapping function $\phi$ to preserve local area ("area preserving mapping") or preserve local angles ("conformal mapping"). The method 100 describes a mapping function $\phi$ providing conformal mapping. This type of mapping may be found by the mathematical approaches more fully described in a first article by S. Haker, S. Angenent, A. Tannenbaum, R. Kikinis, G. Sapiro, M. Halle, entitled "Conformal Surface Parameterization for Texture Mapping," IEEE Transactions on Visualization and Computer Graphics, April-June 2000, vol. 6(2), pp. 181-189 and a second article by X. Gu, Y. Wang, T. F. Chan, P. M. Thompson, S.-T. Yau, entitled "Genus Zero Surface Conformal Mapping and Its Applications to Brain Surface Mapping," IEEE Transactions on Medical Image Analysis, August 2004, Vol. 23(8), pp. 949-958.

Figure 4:
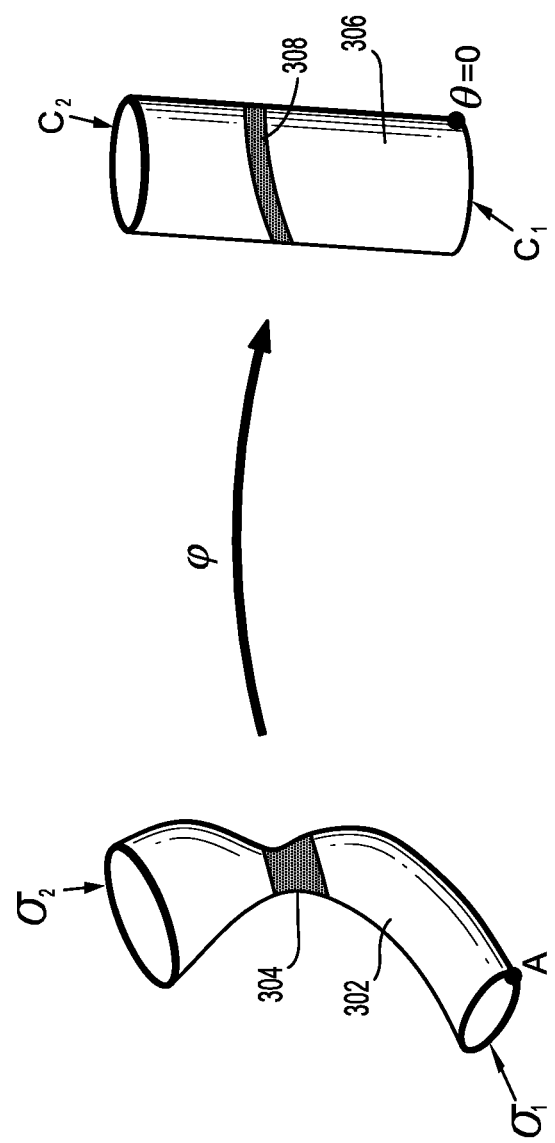
FIG. 4 is a diagrammatic representation of the boundary conditions mapping of a straight blood vessel segment utilizing the method of FIG. 2.

FIG. 4 illustrates the establishment of boundary conditions for the mapping function $\phi$. FIG. 4 particularly shows the boundary conditions mapping of a straight vessel segment 302 with stenosis 304 to a uniform cylinder 306 acting as the template space and having a stenotic segment 308. The boundary of a vessel segment surface after its separation from the parent artery or arteries is a cut, of roughly circular shape, which is topologically equivalent to a circle. A straight vessel segment 302 will have two such ends. Therefore, the mapping function $\phi$ should map a first vessel boundary $\sigma_1$ to a first end circle $C_1$ of the uniform cylinder 306, and the second vessel boundary $\sigma_2$ to the second end circle $C_2$ of the uniform cylinder 306. To map the first vessel boundary $\sigma_1$ to the first end circle $C_1$, the method 100 identifies an arbitrary point A on the first vessel boundary $\sigma_1$ and maps it to the θ=0 position on the first end circle $C_1$. Other points on the first vessel boundary $\sigma_1$ are assigned boundary conditions (i.e., mapped to the first end circle $C_1$) based on their distance from the arbitrary point A along the first vessel boundary $\sigma_1$. Points along the second end circle $C_2$ are corresponded to points on the second vessel boundary $\sigma_2$ in similar fashion.

The mapping of the surface of a blood vessel into a standardized parametric space, such as the unit circular cylinder, has a large number of pre-clinical and clinical research applications. Notably, analysis of the properties of the mapping provides a means to accurately isolate pathologies, such as aneurysms. For example, properties of the surface of the vessel may be analyzed by looking into area distortion due to mapping function $\phi$, the Jacobian of the mapping function $\phi$, or higher order derivatives. Using the area distortion, for example after mapping of an aneurysm-bearing blood vessel onto a unit cylinder, it is possible to use values of area distortion to isolate the aneurysm, and find its ostium. This may have applications in quantification of diseases and in treatment planning. Further, the mapping on the surface of the vessel may be interpolated inside the vessel through a suitable interpolation function. In this case, the centerline of the cylinder provides an automatic and straight forward method to extract the centerline of the vessel, by use of the inverse mapping function $\phi^{-1}$. Further, as briefly noted above, mapping of the same blood vessel surface from different patients into the same standardized space makes it possible to conduct longitudinal and cross-sectional group studies which test hypothesis linking local surface-attached variables (such as local surface irregularities) with pathology, such as aneurysm growth, the risk of rupture, and stenosis.

Also, data from many patients mapped to a standardized space, such as the unit circular cylinder, can be used to create statistical atlases of localized physiological and geometrical information (e.g., wall pressure and curvature) on this standardized space. Mapping of information from statistical atlases to new patients makes this information available for analysis and decision making. Clinical applications include the assessment of aneurysm risk of rupture and the study of aneurysm formation and growth mechanisms. Also, due to the surface flattening achieved by the mapping, the present invention provides a novel technique for visualization of the vessel surfaces on the standardized parametric space. This may provide a standardized way of visual examination of blood vessel surfaces by clinicians and researchers.

Other modifications are possible within the scope of the invention. For example, the subject to be scanned may be an animal subject or any other suitable object rather than a human patient. Also, the imaging system 10 has been described in a simplified fashion and may be configured in various well-known manners and using various well-known components. For example, the components of the imaging system 10 and the image processing system 16 may be modified, supplemented, or omitted as appropriate. Also, the image processing system 16 may incorporate the control portions of the various imaging system 10 components. Also, the image processing system 16 may be modularly constructed with separate but coordinated units, such as a data storage medium, an image processing unit, user interfaces, workstations, workflow servers, etc. Further, although the steps of each method have been described in a specific sequence, the order of the steps may be re-ordered in part or in whole and the steps may be modified, supplemented, or omitted as appropriate.

Also, the imaging system 10 and the image processing system 16 may use various well known algorithms and software applications to implement the processing steps and substeps. Further, the parametric mapping, mapping function $\phi$, and the mapping of the surface-attached quantities each may be implemented in a variety of algorithms and software applications. Further, the method of the present invention may be supplemented by additional processing steps or techniques to remove resulting image artifacts, provide a sufficient number of image frames, or, otherwise, insure reliable blood vessel image processing.

What is claimed is:

1. A method of computer-assisted modeling of a blood vessel in a 3D image, comprising:
   a. isolating a blood vessel segment from the remaining vasculature present in the image;
   b. mapping the surface of the isolated blood vessel segment onto a standardized parametric space, a pathological condition of the isolated blood vessel segment being identifiable through surface-attached variables and quantities of the isolated blood vessel segment transformed by the mapping; and
   c. generating a mapped representation of the isolated blood vessel segment from the results of the mapping,
   wherein the mapping step comprises generating a mapping transformation that is applied to the isolated blood vessel segment to transfer the surface of the segment to the standardized parametric space,
   wherein the mapping transformation is expressed in the mathematical form of: $\phi:V \to T$, where $\phi$ is a mapping function and V is the surface of the vessel segment to be mapped to the template T of the standardized parametric space,
   wherein the mapping transformation is homeomorphic.

2. The method of claim 1, wherein the isolating step comprises a) selecting two or more points on the image of a respective blood vessel to define the limits of the blood vessel segment to be mapped; b) determining a first disc representation, from a set of disc representations of increasing radii that are substantially perpendicular to the axis of the respective blood vessel, to completely separate the blood vessel into two distinct portions; and c) generating an isolated blood vessel segment to be mapped using the first disc representation.

3. The method of claim 1, wherein the template T is a uniform circular cylinder of a fixed radius and height, or a sphere with two caps cut off for a straight vessel segment.

4. The method of claim 1, wherein the template T is a bifurcating uniform cylinder, with a 90 degree bifurcation angle, fixed radii and branch lengths, or a unit sphere with three caps cut off for a bifurcating vessel segment having two branches.

5. The method of claim 1, wherein the template T is a unit sphere with a number of non-intersecting cut-off caps equal to the number of in-flowing and out-flowing pathways of the vessel segment for a vessel segment having N number of branches.

6. The method of claim 1, wherein a pathological condition of the vessel segment is identified in the template T through surface-attached variables and quantities of the vessel segment transformed by the mapping function.

7. The method of claim 1, further comprising generating a coordinate frame for the surface of the vessel segment using the inverse of the mapping function.

8. The method of claim 1, wherein the mapping step operates to preserve a local quality of the surface of the isolated blood vessel segment to minimize distortion.

9. A non-transitory computer readable media comprising software algorithms of computer-readable code executable on a processor, the algorithms comprising:
   a. an algorithm for isolating a blood vessel segment from the remaining vasculature present in a 3D image of blood vessels;
   b. an algorithm for mapping the surface of the isolated blood vessel segment onto a standardized parametric space, a pathological condition of the isolated blood vessel being identifiable through surface-attached variables and quantities of the isolated blood vessel segment transformed by the mapping; and
   c. an algorithm for generating a mapped representation of the isolated blood vessel segment from the results of the mapping,
   wherein the algorithm for mapping generates a mapping transformation that is applied to the isolated blood vessel segment to transfer the surface of the segment to the standardized parametric space,
   wherein the mapping transformation is expressed in the mathematical form of: $\phi:V \to T$, where $\phi$ is a mapping function and V is the surface of the vessel segment to be mapped to the template T of the standardized parametric space,
   wherein the mapping transformation is homeomorphic.

10. The media of claim 9, wherein said algorithm for mapping operates to preserve a local quality of the surface of the isolated blood vessel segment to minimize mapping distortion.

11. The media of claim 9, further comprising an algorithm for segmenting the blood vessels from the background voxels in a 3D image of blood vessels and an algorithm for performing blood vessel surface extraction from the segmented 3D image to generate a blood vessel surface mesh of the blood vessels, said algorithm for isolating comprising an algorithm for isolating a blood vessel segment from the remaining vasculature present in the blood vessel surface mesh.

12. The media of claim 9, further comprising an algorithm for extracting surface-attached variables for each blood vessel of the blood vessel surface mesh to generate surface-attached quantities.

13. A method of processing the 3D images of a patient's vascular structure, comprising,
  constructing mathematical maps from the surfaces of imaged blood vessels to standardized template shapes that describe the general appearance and interconnections of blood vessels for visualization of the vessel surfaces,
  wherein pathologies of a respective imaged blood vessel being isolatable for analysis through surface morphology of the respective imaged blood vessel are transferred onto an associated mathematical map,
  wherein the mathematical maps are constructed by a homeomorphic mapping transformation that is applied to the imaged blood vessels to transfer the surfaces of the imaged blood vessels to the standardized template shapes.

14. The method of claim 13, wherein said constructing comprises generating a mapped visual representation of respective imaged blood vessels in standardized parametric space and a mapped visual representation of surface-attached quantities of the respective imaged blood vessels in standardized parametric space.

15. A medical imaging apparatus, comprising means for processing image data of a vascular structure of a subject to enable the analysis of the shapes and properties of blood vessels of the subject, said means for processing comprising:
  means for constructing mathematical maps from surfaces of imaged blood vessels to standardized template shapes that describe the general appearance and interconnections of blood vessels,
  wherein a pathological condition of a respective imaged blood vessel being distinguishable through surface-attached variables and quantities of the respective imaged blood vessel is transformed in an associated mathematical map,
  wherein the mathematical maps are constructed by a homeomorphic mapping transformation that is applied to the imaged blood vessels to transfer the surfaces of the imaged blood vessels to the standardized template shapes.

16. The apparatus of claim 15, further comprising an image scanner that acquires image data of the vascular structure and generates image data signals for usage by the means for processing.

17. The apparatus of claim 16, further comprising a non-transitory image data storage medium that is adapted to store the image data signals that are generated by the image scanner and the results of any additional operations on the image data signals by the means for processing.

18. A method of computer-assisted modeling of a blood vessel in a 3D image, comprising:
  a. isolating a blood vessel segment from the remaining vasculature present in the image;
  b. mapping the surface of the isolated blood vessel segment onto a standardized parametric space, properties of the isolated blood vessel segment being identifiable through properties of the mapping; and
  c. generating a mapped representation of the isolated blood vessel segment from the results of the mapping, said mapping comprising generating a homeomorphic mapping transformation that is applied to the isolated blood vessel segment to transfer the surface of the segment to the standardized parametric space, said mapping transformation being expressed in the mathematical form of: $\phi: V \to T$, where $\phi$ is a mapping function that comprises conformal mapping or area preserving mapping and V is the surface of the vessel segment to be mapped to the template T of the standardized parametric space.

* * * * *